United States Patent [19]

Fortescue

[11] 4,288,161

[45] Sep. 8, 1981

[54] OPTICAL PROBE FOR DETECTING TRANSITORY AND REPETITIVE LIGHT SIGNALS

[75] Inventor: George H. Fortescue, Granada Hills, Calif.

[73] Assignee: Lockheed Corporation, Burbank, Calif.

[21] Appl. No.: 44,989

[22] Filed: Jun. 4, 1979

[51] Int. Cl.³ .............................................. G01J 1/44
[52] U.S. Cl. .................................. 356/73; 356/73.1; 356/226; 356/227
[58] Field of Search ................. 356/73, 73.1, 226, 227

[56] References Cited

U.S. PATENT DOCUMENTS

| | | | |
|---|---|---|---|
| 3,068,739 | 12/1962 | Hicks, Jr. et al. | 356/39 |
| 3,582,638 | 6/1971 | Peters | 350/96.24 |
| 3,752,980 | 8/1973 | Dixon et al. | 250/552 |
| 3,761,184 | 9/1973 | McLaughlin, Jr. | 356/416 |
| 3,795,863 | 3/1974 | Umeda et al. | 324/96 |
| 3,847,483 | 11/1974 | Shaw et al. | 356/41 |
| 3,884,585 | 5/1975 | Lebduska | 356/73.1 |
| 3,903,870 | 9/1975 | Berndt | 351/18 |
| 3,932,761 | 1/1976 | Ramsey et al. | 250/552 |
| 3,983,389 | 9/1976 | Cowardin et al. | 250/227 |
| 3,987,392 | 10/1976 | Kugelmann et al. | 324/96 |
| 4,037,959 | 7/1977 | Bumgardner | 356/73 |
| 4,070,118 | 1/1978 | Maslowski et al. | 356/239 |

FOREIGN PATENT DOCUMENTS

| | | | |
|---|---|---|---|
| 2717412 | 10/1978 | Fed. Rep. of Germany | 356/73.1 |
| 1537737 | 1/1979 | United Kingdom | 356/73.1 |

*Primary Examiner*—Vincent P. McGraw
*Attorney, Agent, or Firm*—Frederic P. Smith

[57] ABSTRACT

The invention relates to a device for detecting transitory and repetitive light signals from a radiant energy source. The invention comprises a detector means for detecting the light signals and for providing output signals indicative of the presence thereof, first indicator means coupled to the detector means for providing a continuous indication of the initial presence of the light signals and second indicator means for providing an indication of the repetition rate of the light signals. In a particular embodiment, a video amplifier circuit is coupled to a detector circuit to provide an amplified output and a comparator circuit is coupled to the video amplifier circuit and senses the video amplifier circuit output signals above a specified level and produces standard logic level output signals. The output signals from the comparator circuit are coupled to a first indicator circuit incorporating a first light-emitting diode which provides a continuous indication of the initial presence of the light signal. A reset button is incorporated to reset the first indicator circuit, extinguishing the first diode, so it can indicate the presence of subsequent signals. The comparator is also coupled to a second indicator circuit incorporating a second light-emitting diode which is adapted to briefly light for each incoming singal such that a low repetitive rate gives a dim light and a high repetitive rate gives a bright indication, thus providing an indication of the approximate rate of repetitive incoming light signals. An audio amplifier circuit is coupled to the video amplifier circuit and is adapted to provide an audio output. A detector/filter with buffer circuit is coupled to the audio amplifier circuit to provide photometric or radiometric outputs. Provisions are made for the coupling of a flexible fiber-optic cable to the probe so that light signals in otherwise inaccessible areas can be monitored.

10 Claims, 6 Drawing Figures

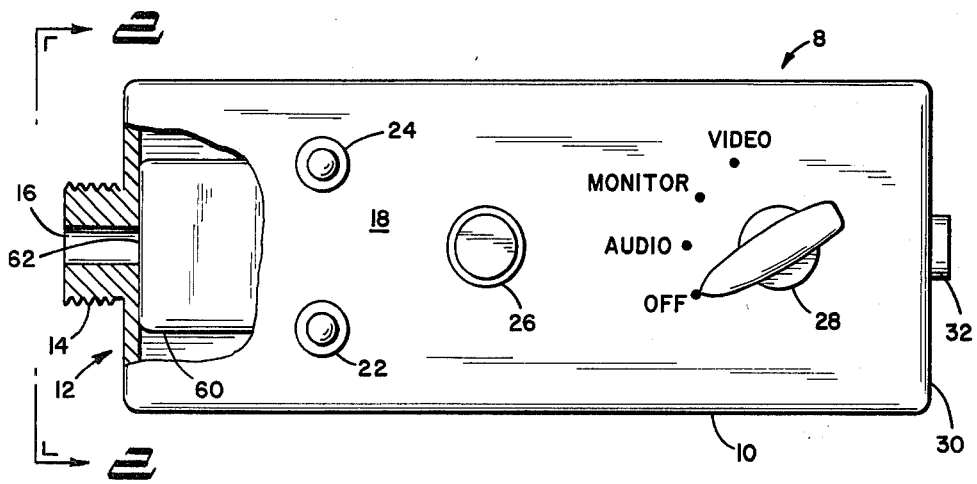
Fig. 1
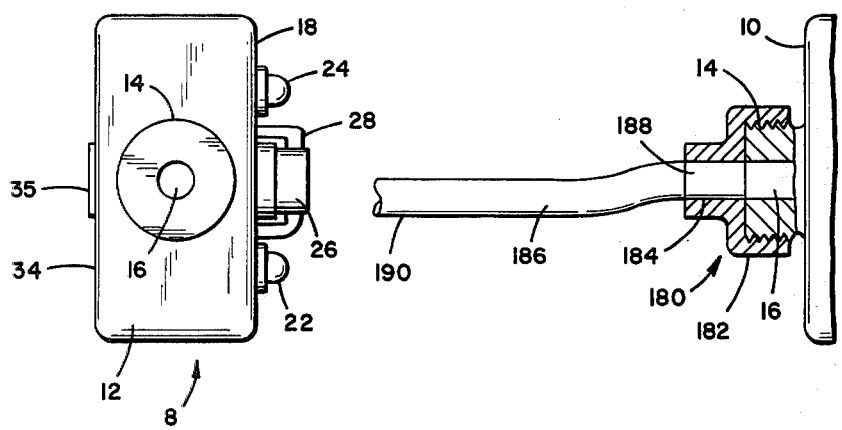
Fig. 2
Fig. 3

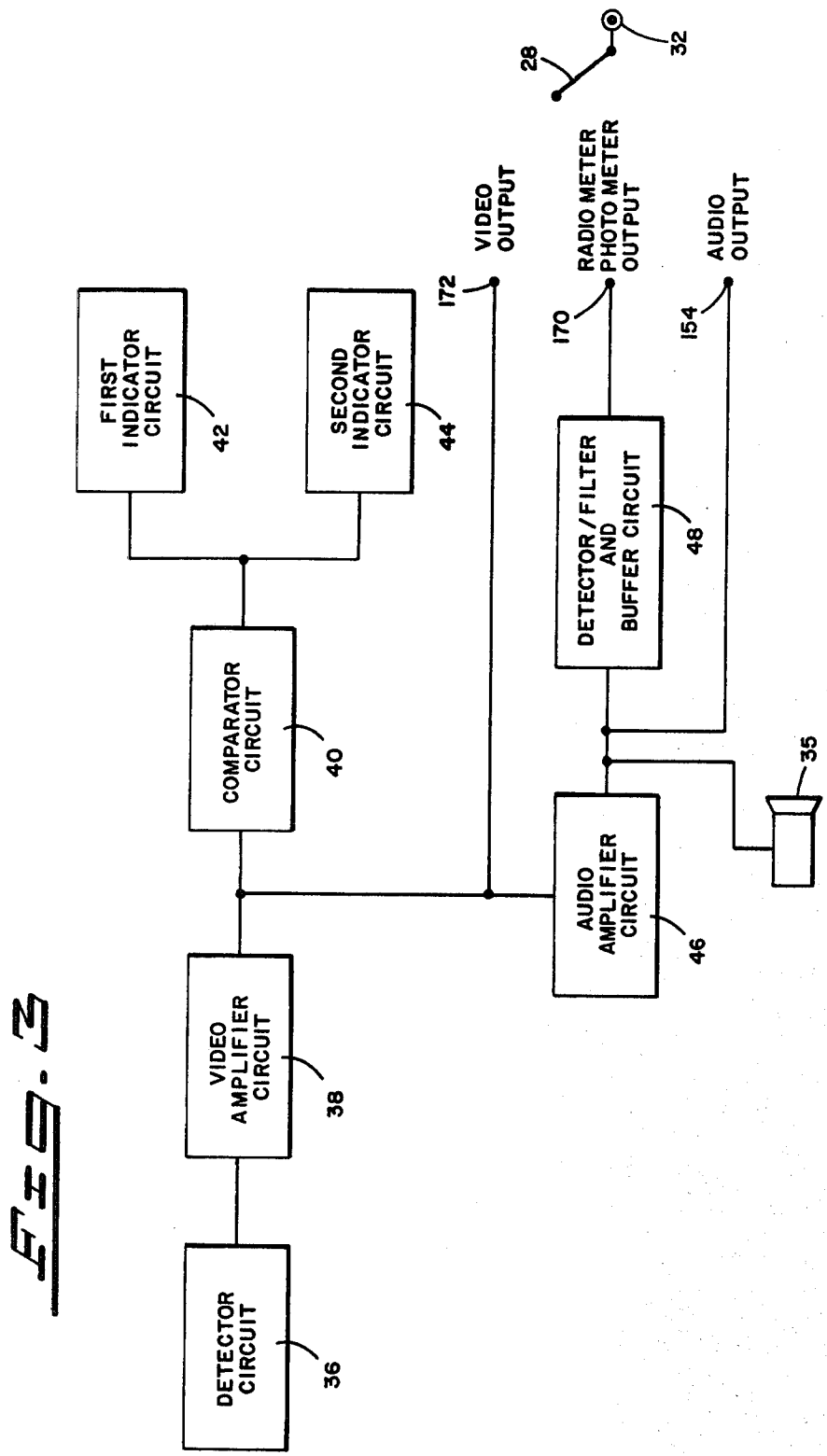

OPTICAL PROBE FOR DETECTING TRANSITORY AND REPETITIVE LIGHT SIGNALS

TECHNICAL FIELD

The invention relates to the field of checkout equipment for optical communication systems and in particular to a portable probe for detecting transitory and repetitive pulses of optical energy.

BACKGROUND OF PRIOR ART

Fiber-optic technology has now advanced to the point where numerous commercial applications exist. For example, fiber optics are now replacing conventional underground telephone lines and are used for transmitting cable TV signals.

Fiber-optic cables may consist of a single filament or several filaments or even hundreds of optical fibers, but each fiber is a wholly independent optical waveguide in its operation, in that it contains and transmits the signals completely within each fiber and an almost zero field of optical energy is produced which may be externally detected or monitored in any way. Consequently, fiber optical signal information transmission provides a highly secure system. Thus they are being applied to computers for interconnecting mainframes to peripherals.

One of the most promising applications is the replacing of conventional metal wire in aircraft with fiber-optics. Not only are the fiber-optic cables lighter in weight, but the possibility of electro-magnetic interference is eliminated.

Unfortunately, generally available photometric test equipment is ill-suited to fiber-optic component and system evaluation. Radiometric measurements outside the visible spectrum are usually required and the mechanical means to couple the fibers' emitting signals and detection devices to standard instrumentation is frequently nonexistent or limited to providing comparative readings. Not only must the integrity of the fiber-optic filament be established but also the light source whether it be light-emitting diode or laser diode, and preferably while these components remain installed.

The prior art systems in general deal only with fault detection in fiber-optic cables and require removal of the cable from the system for checking of integrity. For example, U.S. Pat. No. 3,884,585, Fiber Break Detection Method for Cables Using Multi-Fiber Optical Bundles, by Robert L. Lebduska, discloses a method of detecting broken fibers or filaments in a fiber-optic bundle. The procedure requires that individual bundles be removed and placed in a test fixture in which one end of the bundle is illuminated with a light source and the transmitted light emitting from the face of the receiving cable end is magnified by a microscope. A second light is used to illuminate the surface of the receiving cable end in order to enable the faces of the broken fibers to be distinguishable from the remaining background.

Another example is U.S. Pat. No. 4,070,118, Method and an Arrangement for Fault Location in a Glass Fiber Optical Waveguide, by Stefan Maslowski et al., which discloses a method of locating faults in a glass fiber by using a laser device to feed light pulses into the fiber, feeding the light pulses reflected back from the fault in the fiber into the laser device allowing the determination of the physical location of the fault from the known propagation time of the reflective pulses. While this device can locate faults without requiring the removal of the fiber-optic cable, it cannot be used to test emitters or to monitor transmitted signals.

Available apparatus for determining the characteristics of emitters typically have the disadvantage of requiring their removal from the system for check out. For example, U.S. Pat. No. 3,752,980, Apparatus for Measuring Electroluminescent Device Parameters, by Richard Wayne Dixon et al., discloses a method to determine the output characteristics of an electroluminescent device which is accomplished by installing the device in a test circuit wherein the output characteristics are measured as a function of the amplitude of an input current pulse. Another disadvantage of such an apparatus is that it cannot be used to check out fiber-optic cables nor can it determine if specific light signals are being transmitted.

It is also very important to be able to determine if both transitory and repetitive signals are being transmitted from one station to another, for example, from a main computer to peripherals. The transitory signals may be of short duration and being invisible radiant energy, not electrical wave forms, they simply cannot be readily observed by the technician on an oscilloscope or the like. It is also desirable to have means to record the received signals for subsequent detailed analysis. Another desirable capability is to be able to convert received light signals to audio signals to provide additional monitoring capability.

Thus, it is a primary object of this invention to provide a method of detecting both transitory and repetitive light signals in optical communication systems without requiring removal of system components.

A further object of this invention is to provide means of converting received light signals to radiometric or photometric signals.

Another object of this invention is to provide a means to convert received light signals to audio signals.

Still another object of this invention is to provide a video output of received repetitive and transitory light signal.

SUMMARY OF INVENTION

The invention relates to a device for detecting transitory and repetitive light signals from a light source, such as a fiber-optic cable or a light-emitting diode. The invention comprises detector means for detecting said light signals and for providing output signals indicative of the presence thereof, first indicator means coupled to said detector means for providing a continuous indication of the initial presence of said light signals, and second indicator means for providing an indication of the repetition rate of said light signals.

In a particular embodiment, a video amplifier circuit is coupled to a detector circuit to provide an amplified output and a comparator circuit is coupled to the output of the amplifier circuit and is adapted to sense the amplified output signals and produce standard zero and 5-volt logic level output signals. The output signal from the comparator is coupled to a first indicator circuit incorporating a first light-emitting diode which provides a continuous indication of the initial presence of the light signals by lighting the first diode. A reset button is incorporated to reset the first indicator circuit, extinguishing the first diode, so it can indicate subsequent received signals. The comparator is also coupled to a second indicator circuit incorporating a second light-emitting diode which is adapted to briefly light for each incoming signal such that a low repetitive rate gives a dim light and a high repetitive rate gives a bright indication providing an indication of the approximate rate of repetitive incoming light signals.

In addition, an audio amplifier circuit is coupled to the video amplifier circuit, which converts the output from the video amplifier to audio signals. Coupled to the audio amplifier circuit is a detector/filter and buffer circuit which is adapted to convert the audio signals to radiometric or photometric outputs. A function switch is provided which is adapted to selectively connect the output from the video amplifier circuit, the audio amplifier circuit and the detector/filter and buffer circuit to an output jack for connection to external presentation equipment.

The novel features which are believed to be characteristic of the invention, both as to its organization and to its method of operation, together with further objects and advantages thereof, will be better understood from the following description in connection with the accompanying drawings in which a presently preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a top view of the optical probe of the present invention, providing a partial cross sectional view of the front portion of the probe.

FIG. 2 is a front view of the optical probe of the present invention, taken along the line 1—1 of FIG. 1.

FIG. 3 is a block schematic diagram of the present invention.

FIG. 5 is a partial view of the top portion of the optical probe as shown in FIG. 1 with an optional fiber-optic cable extension shown installed.

DESCRIPTION OF PREFERRED EMBODIMENT

Figure 4A:
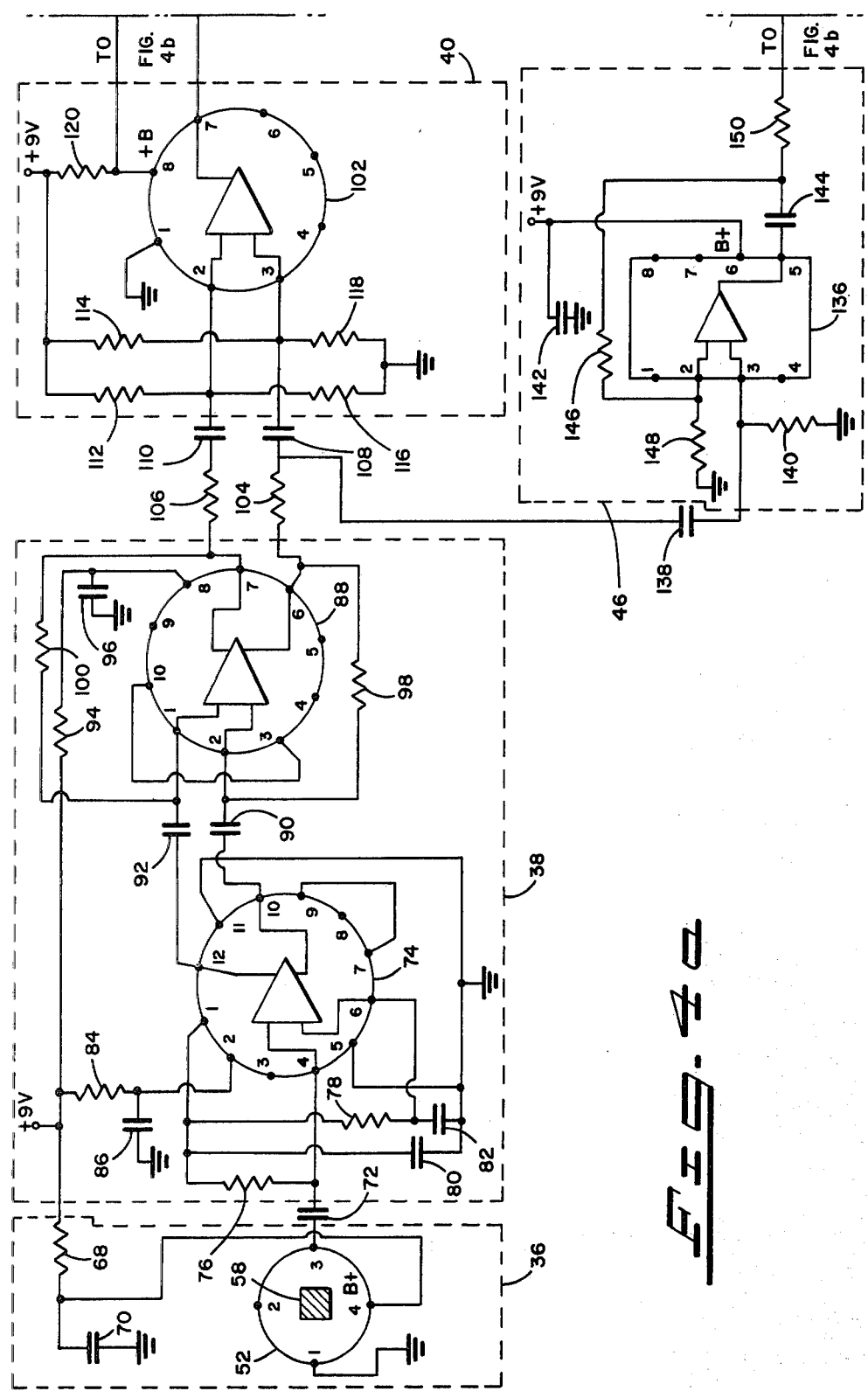
FIGS. 4a,b is an electrical schematic diagram of the present invention.
Figure 4B:
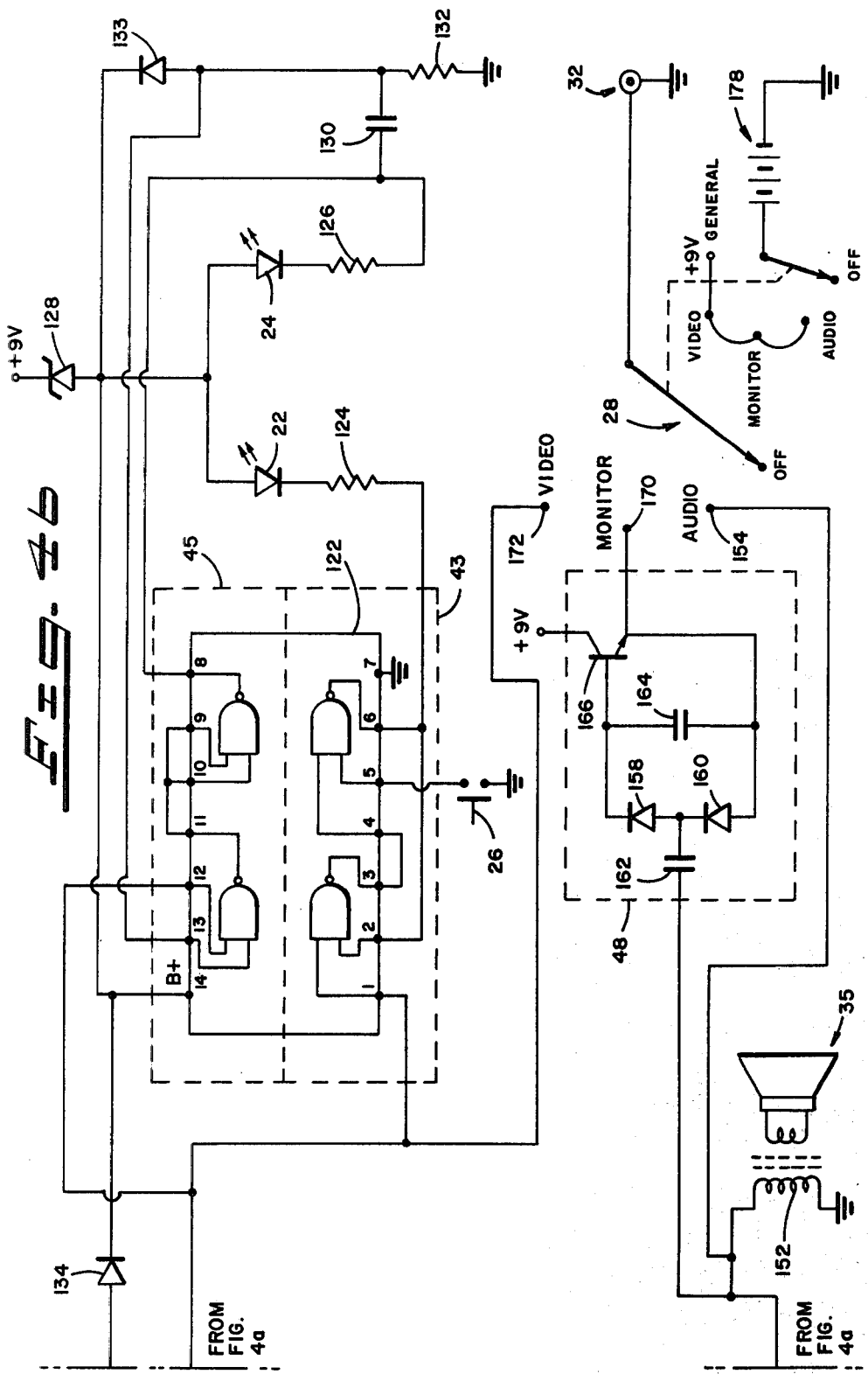

Referring initially to FIGS. 1 and 2 which illustrate a top and front view of the probe generally noted by numeral 8, it can be seen that the probe 8 physically consists of a rectangular-shaped box 10. At the forward end 12 of the box 10 is a threaded fitting 14 having a centrally located aperture 16. Mounted on the top 18 of the box 10 are a first light-emitting diode 22, a second light-emitting diode 24, a reset button 26 and a function setting switch 28. Mounted on the rear 30 of the box 10 is an output jack 32. Mounted on the bottom 34 of the box 10 is a loudspeaker 35. The function of each of the components so far described will be subsequently explained in detail.

Still referring to FIGS. 1 and 2 and additionally to FIG. 3 which presents a block schematic diagram of the electrical circuits of the probe 8, a detector circuit 36 is shown and is adapted to sense light signals from a fiber-optic cable or other light source and preferably incorporates a preamplifier integrally therein (not shown). Unless otherwise stated the term light hereafter used is meant to also include invisible radiant energy in the infrared and ultra violet portions of the spectrum. The detector circuit 36 is coupled to a video amplifier circuit 38 which is used to amplify the output of detector circuit 36 up to a working level. The video amplifier circuit 38 is coupled to a comparator circuit 40 which senses signals above a chosen level and generates standard voltage logic levels. The comparator circuit 40 in turn is coupled to a first indicator circuit 42, which incorporates a light emitting diode 22 and which provides a continuous indication of the initial presence of the light signals by lighting diode 22 until the reset button 26 is depressed. The comparator circuit 40 is also coupled to a second indicator circuit 44 which incorporates the second light emitting diode 24 and which briefly lights diode 24 for each incoming signal such that a low repetitive rate gives a dim light and a high repetitive rate gives a bright indication.

In addition, an audio amplifier circuit 46 is coupled to the video amplifier circuit 38 and converts the received transitory and repetitive light signals to audio signals. A detector/filter and buffer circuit 48 is coupled to the audio amplifier circuit 46 and is adapted to convert the audio signals to radiometric or photometric outputs. The function setting switch 28 is adapted to selectively couple the outputs from the video amplifier circuit 38, the audio amplifier circuit 46 and the detector/filter and buffer circuit 48 to the output jack 32 for connection to external presentation equipment (not shown). The loudspeaker 35 is also activated when the switch 28 couples the output from the video amplifier circuit 38 to the output jack 32.

Referring now to FIGS. 4a,b which is an electrical schematic diagram of the electrical circuits represented by the block diagram shown in FIG. 3, the detector circuit 36 incorporates a hybrid type opto-electronic receiver 52 which consists of a silicon pin diode designated by numeral 58 operated in the photo-conductive mode, with an integral hybrid preamplifier (not shown). A suitable receiver 52 is model MDF328 manufactured by Meret Incorporated, Santa Monica, Calif. Another suitable receiver is Model 539-003-5, manufactured by Devar, Incorporated, Bridgeport, Conn. There are of course numerous other models of detector/preamplifier combinations that are suitable.

Referring back to FIG. 1, the receiver 52 (not shown) is mounted in a case 60 having an optical window 62 such that diode 58 of the receiver 52 is aligned with the window 62 and thus also is aligned with the aperture 16 in the fitting 14 of the box 10.

Again referring to FIGS. 4a,b, a +9 volt DC voltage is applied via power supply decoupling resistor 68 to the B+ terminal 4 of the receiver 52. Terminal 1 of the receiver 52 is connected to ground. Terminal 4 is connected to ground via a bypass capacitor 70. Resistor 68 and capacitor 70 combine to provide the proper bias for the receiver 52. The circuit 36, therefore, consists of receiver 52, capacitor 70 and resistor 68.

The output terminal 3 of the receiver 52 is connected via coupling capacitor 72 to the input terminal 4 of a first video amplifier stage 74 of the video amplifier circuit 38. The amplifier stage 74 amplifies the output of the receiver 52 to a working level of several hundred millivolts. The amplifier stage 74 illustrated is a model CA3040, manufactured by RCA Incorporated, Somerville, N.J. It is operated in the bias mode B. Of course, other types of video amplifier stages are suitable as, for example, model 733 manufactured by the Signetics Corporation, Sunnyvale, Calif.

The output from terminal 3 of the receiver 52 is also connected via resistor 76 to terminal 1 and via resistor 76 and resistor 78 to terminal 6 of the amplifier state 74. Terminals 1 and 6 are connected to ground via capacitors 80 and 82, respectively. The resistors 76 and 78 and capacitors 80 and 82 in effect make the input to the amplifier stage 74 a single ended input while providing correct bias. Terminals 5 and 11 of amplifier stage 74 are connected to ground and terminals 7 and 9 are connected together to establish a db gain of about 33 to 34. A +9 volt DC voltage is applied to terminal 2 through a power supply decoupling network composed of resistor 84 and capacitor 86 which in turn is connected to ground.

In the present embodiment, a second video amplifier stage 88 is utilized to provide a stronger output signal from the video amplifier circuit 38; in this case a model 733, manufactured by Signetics Corporation, is used although a second model CA3040, for example, could also be used. The output terminals 10 and 12 of amplifier stage 74 are connected to terminals 2 and 1, respectively, of the amplifier stage 88 via coupling capacitors 90 and 92. Terminal 3 is connected to terminal 10 to control the voltage gain to around 100. A +9 volt DC voltage is applied to terminal 8 through a power supply decoupling network consisting of resistor 94 and capacitor 96, which is connected to ground. A portion of the outputs of amplifier stage 88 are fed back from terminals 6 and 7 to the input terminals 2 and 1 respectively via feedback resistors 98 and 100. The circuit 38 therefor consists of amplifier stages 74 and 88; resistors 76, 78, 84, 94 and 98; and capacitors 80, 82, 86, 90, 92 and 96.

The output from terminals 6 and 7 of the amplifier stage 88 are coupled to the input terminals 3 and 2 of a comparator 102 of the comparator circuit 40 through isolation resistors 104 and 106 and coupling capacitors 108 and 110. The comparator 102 senses signals above a chosen level and by a Schmitt Trigger type action generates standard 0 or 5 volt logic levels. The comparator 102 shown is a model LM111H manufactured by National Semiconductor Corporation, Santa Clara, Calif. Other suitable comparators are manufacted by RCA.

A +9 volt DC voltage is applied to terminals 2 and 3 of the comparator 102 via resistors 112 and 114 respectively. Terminals 2 and 3 are also coupled to ground via resistors 116 and 118 respectively. The resistors 112, 114, 116 and 118 provide proper input impedance and bias for the comparator 102. A +9 volt DC voltage is also applied to terminal 8 of the comparator 102 through a resistor 120 which provides a voltage drop to about 5½ volts at terminal 8. The circuit 40 therefor consists of comparator 102, and resistors 112, 114, 116, 118 and 120. The detector circuit 36, video amplifier circuit 38 and comparator circuit 40 constitutes a detector means.

Terminal 7, which is the output terminal of the comparator 102, is coupled to both the first indicator circuit 42, which is a holding latch circuit, and the second indicator circuit 44, which is a self-resetting latch circuit. The circuits 42 and 44 are assembled using a model 7400 quad-2 input nand gate designated by numeral 122. The Model 7400 is manufactured by Signetics Corporation and many other companies and is hereafter identified as gate 122. The output terminal 7 of the comparator 102 is coupled to input terminals 1 and 12 of the gate 122. Output terminal 3 and input terminal 4 of the gate 122 are connected together while output terminal 11 is connected to input terminals 9 and 10. Terminal 7 is connected to ground. Input terminal 5 is connected to ground via normally-open reset button 26. Output terminal 6 and input terminal 2 are connected together and coupled to the first light emitting diode 22 via current limiting resistor 124. Output terminal 8 is coupled to the second light emitting diode 24 via a second current limiting resistor 126. Terminal 14 is coupled to the +9 volt DC voltage source through resistor 120 and diode 124.

Both diodes 22 and 24 are coupled to a +9 volt DC voltage source through a voltage limiting zener diode 128 which reduces the +9 volt to a nominal +5 volt level. The output terminal 8 is also coupled to a capacitor 130 and resistor 132, which is connected to ground. The capacitor 130 and resistor 132 provide a time constant for the second indicating circuit 44, i.e. the time that the light emitting diode 24 remains on after any given transitory or repetitive light signal is received.

The first and second indicator circuits 42 and 44 operate as bi-stable and monostable latch circuits 43 and 45, respectively. Each of the four dual input elements in gate 122 is a logic inverting device such that the output goes high (to approximately +5 volts) when either one of the two inputs is pulled down to ground. Since the logic elements of latch circuit 43 are DC cross-coupled the bi-stable latch circuit 43 will remain in one or the other state indefinitely until the input not used as part of the cross-coupling (input terminal 5) is at least momentarily grounded. Since the logic elements of latch circuit 45 are partially cross-coupled via an AC only coupling element (capacitor 130) the monostable latch circuit 45 reverts automatically to the state that makes terminal 8 go high (light off). Since resistor 132 is of too high a value to hold input terminal 13 low, output terminal 11 automatically returns low 25 microseconds after a low going input pulse on terminal 12 has occurred.

In operation, a transitory light signal will cause diode 22 to light and stay on until reset button 26 is pressed which connects input terminal 5 of gate 122 to ground and thus extinguish diode 22. The transitory light signal will cause diode 24 to light only momentarily. Subsequent repetitive light signals will cause diode 24 to flicker at a rate determined by the values of capacitor 130 and resistor 132. While a wide latitude in the selection of the time constant is allowable, a 25 microsecond period has proved advantageous. With this time constant, signals in the 20–40 Hz range will cause the diode 24 to appear dimly lit all the time and increases in frequency will make the diode 24 brighter. To avoid confusion, the diodes 22 and 24 should be of a different color, for example diode 22 may be red and diode 24 may be yellow. The use of diodes greatly simplifies the design of the probe, but it should be noted that conventional light bulbs could be used if the circuitry were suitably modified.

The capacitor 130 is also coupled to a diode 133 which during the reset process prevents the capacitor 130 from being charged to a level higher than +5 volts, i.e., it re-establishes the charge level on the capacitor 130. The diode 133 in turn is connected to a +9 volt DC power source through the zener diode 128. The capacitor 130 is additionally coupled to input terminal 13 of the gate 122. Terminal 8 of comparator 102 is coupled to terminal 14 of gate 122 via diode 134 which prevents any feedback transients from gate 122 being fed back via terminal 14 into the comparator 102 and affecting its operation. Thus, the circuit 42 consists of bi-stable latch circuit 43, reset button 26, resistor 124, light emitting diode 22 and diode 128; while circuit 44 consists of monostable latch circuit 45, light emitting diode 24, diodes 128, 133 and 134, capacitor 130 and resistors 126 and 132.

It is often desirable to have an audio indication of the signals received as an additional monitoring capability. In addition, personnel checking out fiber-optic links, as, for example, between a computer and a remote peripheral, would be able to communicate by voice if appropriate equipment were available to convert speech to light signals. This capability, as previously mentioned, is provided by incorporating the audio amplifier circuit 46. The circuit 46 is built around an audio amplifier 136, model LM386N manufactured by the National Corporation. An alternate amplifier 136 is a model CA 3020 manufactured by RCA.

The non-inverting input terminal 34 of the amplifier 136 is coupled to the output terminal 6 of the amplifier stage 88 via resistor 104 and coupling capacitor 138. Terminal 3 is also coupled to ground via biasing resistor 140. Terminal 6, which is the B+ terminal, is coupled to a +9 volt DC power source and bypass capacitor 142 which in turn is connected to ground. The capacitor 142 filters the B+ voltage. The output terminal 5 of the amplifier 136 is connected to coupling capacitor 144 and a portion of the output of amplifier 136 is fed back via resistor 146 to the inverting input terminal 2. The terminal 2 is coupled to ground via resistor 148. Resistors 146 and 148 are used to set the proper gain for amplifier 136. The output from terminal 5 of amplifier 136 is coupled via capacitor 144 and resistor 150 to the loudspeaker 35 via impedance matching transformer 152 and then to an audio output terminal 154. Therefore, this circuit 46 consists of amplifier 136, capacitors 142 and 144, and resistors 140, 146, 148 and 150.

Referring again to FIGS. 4a,b photometric or radiometric readout capabilities are provided by also coupling the output terminal 5 of amplifier 136 to the detector/filter and buffer circuit 48. The circuit 48 consists of diodes 158 and 160, capacitors 162 and 164 which are coupled together to form a full wave voltage doubling circuit, a transistor 166 connected as an emitter follower and emitter load resistor 168. The output from the circuit 48 connects to a monitor terminal 170. The circuit 48 therefore provides a smoothed DC level proportional to the average incoming signal. The emitter follower 166 presents a high impedance level to the voltage doubler and a lower output impedance to terminal 170.

The switch 28 is adapted to connect the terminals 154 for audio monitoring, monitor terminal 170 for photometric or radiometric readings and terminal 172 which is connected to the output terminal 6 of amplifier stage 88 by resistor 104 for video readings, to the output jack 32. The switch 28 also connects battery 178, which is the DC power source, to the circuits as designated in the schematic.

In some applications it may not be possible to physically bring the probe 8 into alignment with the light emitting source. In such cases the adapter 180 shown in FIG. 5 may be used. The adapter 180 consists of a fitting 182 having internal threads adapted to mate with fitting 14 of the box 10. The fitting 182 also has a central aperture 184 in which is fitted a flexible fiber-optic cable 186. With the fitting 180 mounted on the fitting 14 of the box 10, the end 188 of the cable 186 is automatically aligned with the aperture 16 of the fitting 14. The opposite end 190 of the cable 186 can easily be aligned with the light emitting source in otherwise inaccessible areas.

While the operating values of the various components such as resistors, capacitors, diodes, etc. can easily be determined by those with ordinary skill in the art, the following chart of the values of the components normally used in assembling a probe will be of aid to those practicing this invention.

| ITEM | MODEL NO | MANUFACTURE |
|---|---|---|
| RECEIVER | MDF328 | MERET CORP. |
| 52 | | |
| DIODES | | |
| 22 | MV5023 (RED) | MONSANTO CORP. |
| 24 | MV5322 (YELLOW) | PALO ALTO, CA. |
| 128 | IN5230 | MOTOROLA CORP. PHOENIX, AZ. |
| 133 | IN662 | |
| 134 | IN456 | SYLVANIA CORP. |
| 158 | IN277 | WOBURN, MA. |
| 160 | IN277 | |
| TRANSISTOR | | SPRAGUE CORP. |
| 166 | 2N2925 | N. ADAMS, MA. |
| AMPLIFIERS | | |
| 74 | CA 3040 | RCA CORP. |
| 88 | 733 | SIGNETICS CORP. |
| 136 | LM 386N | NATIONAL CORP. |
| COMPARATOR | | |
| 102 | LM 111 | NATIONAL CORP. |
| QUAD 2-INPUT NAND GATE | | SIGNETICS CORP. |
| 122 | 7400 | |

| RESISTOR NO | RESISTANCE OHMS | CAPACITORS | CAPACITANCE MICRO FARADS (EXCEPT P = PICO FARADS) |
|---|---|---|---|
| 68 | 62 | 70 | 2.2 |
| 76 | 910 | 72 | 1.0 |
| 78 | 910 | 80 | 1.0 |
| 84 | 47 | 82 | 1.0 |
| 94 | 30 | 86 | 2.2 |
| 98 | 1 meg | 90 | 1.0 |
| 100 | 1 meg | 92 | 1.0 |
| 104 | 62K | 96 | 1.5 |
| 106 | 62K | 108 | 82P |
| 112 | 6.2K | 110 | 82P |
| 114 | 6.2K | 130 | 1000P |
| 116 | 6.2K | 138 | 0.022 |
| 118 | 6.2K | 142 | 4.7 |
| 120 | 1K | 144 | 4.7 |
| 124 | 390 | 162 | 1.0 |
| 126 | 240 | 164 | 1.0 |
| 132 | 22K | | |
| 140 | 620K | | |
| 146 | 330K | | |
| 148 | 620K | | |
| 150 | 180 | | |
| 168 | 10K | | |

While the optical probe has been described with reference to a particular embodiment, it should be understood that such an embodiment is merely illustrative as there are numerous variations and modifications which may be made by those skilled in the art. Thus, the invention is to be construed as being limited only by the spirit and scope of the appended claims.

INDUSTRIAL APPLICATION

The optical probe is useful for the inspection and checkout of fiber-optic communication systems.

I claim:

1. A device for detecting transitory and repetitive light signals comprising:
   detector means for detecting said light signals and for providing output signals indicative of the presence thereof;

first indicator means coupled to said detector means for providing a continuous indication of the initial presence of said light signals; and second indicator means coupled to said detector means for providing an indication of the repetition rate of said light signals.

2. The device of claim 1 further including audio amplifier means coupled to said detector means adapted to sense said output signals and convert them to audio signals.

3. The device of claim 2 further including means coupled to said audio amplifier adapted to sense said audio signals and produce radiometric or photometric output signals.

4. The device of claim 1 wherein said detector means comprises:
   a diode operated in the photo-conductive mode adapted to produce an electrical signal proportional to said light signals;
   amplifier means coupled to said diode adapted to amplify said electrical signal produced by said diode; and
   comparator means coupled to said amplifier means adapted to sense said amplified signals and generate standard logic level voltages.

5. The device of claim 1 wherein said first indicator means includes means to manually terminate said continuous indication.

6. The device of claim 1 wherein said first and second indicator means include first and second lights respectfully to indicate the presence of said light signals.

7. The device of claim 6 wherein said second indicator means includes means for briefly lighting said second light for each incoming signal, whereby a low repetition rate provides a dim light and a high repetition rate provides a bright light.

8. The device of claim 1 wherein said first indicator means comprises:
   a light;
   a holding latch circuit coupled to said light adapted to continuously hold said light on upon receipt of said light signals; and
   a reset button coupled to said holding latch circuit adapted to turn off said light.

9. The device of claim 1 wherein said second indicator means comprises:
   a light; and
   a self resetting latch circuit coupled to said light adapted to briefly light said light for each incoming signal such that a low repetitive rate provides a dim light and a high repetitive rate provides a bright light.

10. The device of claim 9 wherein said self resetting latch circuit is adapted to hold said light on for approximately 25 microseconds for each received signal.

* * * * *